E. MATTSON.
VENDING METER.
APPLICATION FILED JUNE 29, 1910.
1,054,012.
Patented Feb. 25, 1913.
2 SHEETS—SHEET 1.
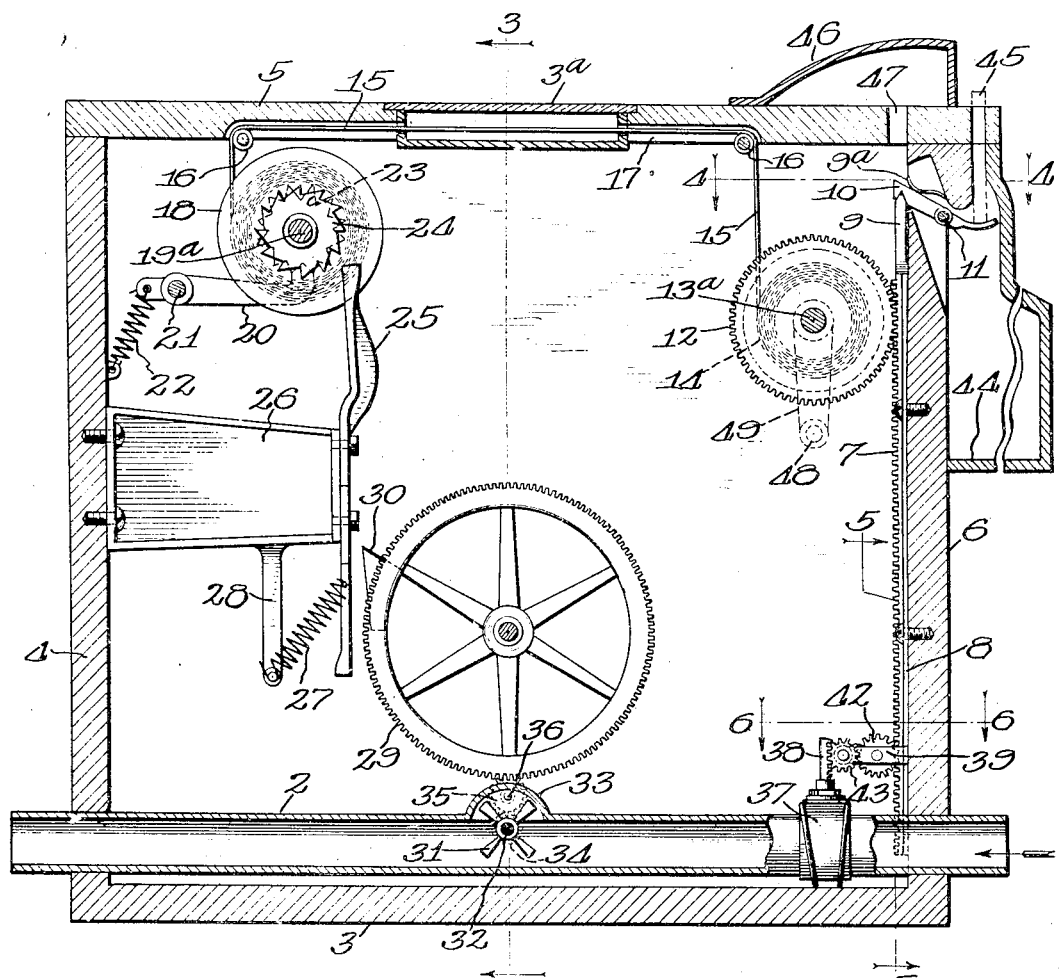

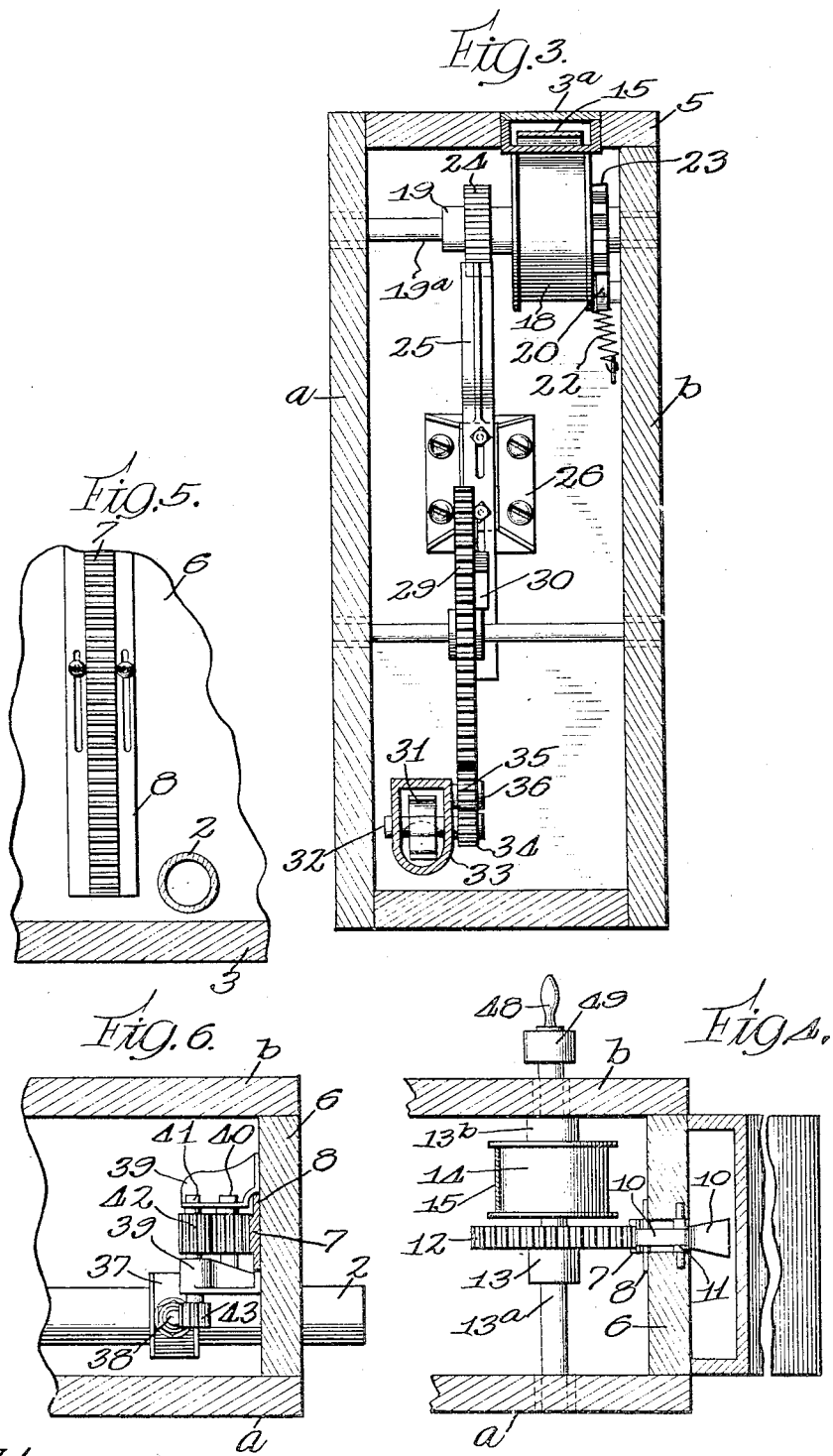

UNITED STATES PATENT OFFICE.

EMIL MATTSON, OF DES MOINES, IOWA.

VENDING-METER.

1,054,012.

Specification of Letters Patent.　Patented Feb. 25, 1913.

Application filed June 29, 1910.　Serial No. 569,586.

*To all whom it may concern:*

Be it known that I, EMIL MATTSON, a citizen of the United States, residing at Des Moines, in the county of Polk and State of Iowa, have invented certain new and useful Improvements in Vending-Meters, of which the following is a specification.

This invention relates to vending meters and more particularly to a coin controlled device of the kind intended primarily for measuring the amount of water that flows through a pipe.

With this and other objects in view the invention consists in the combination and arrangement of parts to be hereinafter fully described in the following specification, pointed out in the claim and illustrated in the accompanying drawings which form a part of said specification and in which—

Figure 1 is a front elevation, partly in section, of the meter. Fig. 2 is a detail of the measuring tape used. Fig. 3 is a vertical cross section of the meter taken on line 3—3 of Fig. 1. Fig. 4 is a horizontal section giving a plan view of one tape wheel. Fig. 5 is a detail of the vertical rack employed. Fig. 6 is a plan of the automatic cut-off employed.

Like reference characters indicate corresponding parts throughout the several views.

2 is a water pipe through which the water to be measured flows. This pipe extends through and beyond a meter casing 3, 4, 5, 6 preferably near the floor 3 thereof.

3ª is a gage glass arranged in the top of the casing.

7 is a vertical rack secured to a plate 8, which plate 8 is in turn secured to the end 6 of the casing, in such a manner that it is capable of movement vertically; this rack is provided with a head 9 on one end which receives a lever 10 pivoted as at 11 in the end 6 of the meter. A spring 9ª secured in the casing yieldingly holds lever 10 against the head of the rack.

12 is a cog-wheel arranged on a hub 13 which is secured to a shaft 13ª journaled in the sides *a, b,* of the meter casing and its teeth work over the teeth of the vertical rack 7 to raise and lower the same vertically.

14 is a tape spool arranged on hub 13ᵇ. Tape 15 having the measuring scale marked thereon has one end secured to the spool 14 from which spool it runs up and over a pair of pulleys 16, 16 secured in a recess 17 in the top 5 of the casing, and down and over another tape spool 18 arranged on a hub 19 secured to the shaft 19ª journaled in the sides *a, b,* of the casing.

20 is a pawl arranged on a pivot 21 in sides *a, b,* of the casing and having a spring 22 attached to one end, the other end of the spring being secured to the end 4 of the casing. The free end of this pawl is adapted to slide over the teeth of wheel 23 secured on hub 19 and to permit rotation of the same freely in a direction that will wind the tape upon the spool 18 but to offer a slight resistance to a reverse motion so that a slight jarring of the box would not render the mechanism inoperative.

24 is a cog-wheel arranged on hub 19 and adapted to impart intermittent motion to the same through contact with an upright arm 25; arm 25 being movably secured to a plate 26 which plate is secured to the end 4 of the casing. The lower end of arm 25 has a spring 27 secured thereto, the opposite end of the spring being attached to a finger 28 depending from the bottom of plate 26.

29 is a serrated power wheel having a projection 30 arranged on the circumference which projection is adapted for engagement with the lower extremity of arm 25 with each revolution of wheel 29.

31 is a water-wheel arranged on a shaft 32 which is journaled in a pocket 33 arranged transversely of the water pipe 2. One extremity of shaft 32 carries a pinion 34 that meshes with another pinion 35 arranged on a stub shaft 36 secured to pocket 33, this last named pinion meshing with the power-wheel 29 and driving the same.

Referring again to the water pipe 2 the same is provided with an automatic shut-off the description of which follows: 37 is a casing surrounding the pipe 2 and supporting a damper that resides within the water pipe, whose vertical diameter is approximately three-fifths the vertical diameter of the water pipe, which damper has a serrated handle 38 projecting up through the top of the casing 37. 39, 39 are a pair of brackets secured to the side 6 of the meter casing adjacent the plate 8 and affording bearings for a pair of shafts 40 and 41. These shafts each carry one member of a spur gear 42, one member of this gear meshing with the vertical rack 7. One end of shaft 41 is further provided with a spur 43 that meshes with the handle 38 of the damper and affords a means of raising or lowering this damper in the water pipe. 44 is a coin box secured to the meter casing and having an opening 45 in the top thereof to admit the coin. A hood 46 is arranged on the meter casing near the coin box and over an opening 47 in the casing through the latter and into the former of which the rack 7 is adapted to pass while the mechanism is in operation. 48 is a handle extending out through the side b of the meter casing and connected by belt 49 with hub 13ᵇ on which tape spool 14 is arranged and which hub is secured to the shaft 13ª. This handle is to wind the tape on the spool after the same has been unwound by the operation of the meter and through the medium of cog-wheel 12 to raise rack 7 well up into the hood 46 which lifts the damper and permits free flow of the water.

Operation: In the position shown in Fig. 1 the supply of water is shut off. By dropping a coin in the opening 45 of the coin box the same strikes the lever 10 and raises it against the tension of spring 9ª from the rack head. The operator must now grasp the handle 48 and turn the same to the left. This operation will wind the tape upon the spool 14 and unwind it from spool 18 and at the same time it will raise the rack 7 vertically as high as it can go thus opening the water pipe. The water running through this pipe will turn the water wheel 31 which by its connections will turn power wheel 29 which through the medium of arm 25 will impart intermittent motion to the shaft 19ª which will wind the tape 15 upon the spool 18 arranged on that shaft thus unwinding it from spool 14, turning shaft 13ª with cog-wheel 12 thereon which gradually lowers rack 7 until this rack through contact with the mechanism shown in Fig. 6 will automatically shut off the supply of water when the coin inserted will have been spent and the machine will be once more in position for another coin. A suitable opening is provided in the coin box for the removal of the coins deposited.

What is claimed is—

In a coin controlled device, an apertured casing having a hood disposed over one aperture, a coin receiving box disposed upon said casing over another aperture therein, a spring-pressed lever pivoted in the apertured portion of said casing and extending into the said coin box, a rack slidably secured within said casing normally in contact with said lever, a serrated wheel journaled in the casing and provided with a circumferential projection, means for actuating said wheel, cut-off means for the said wheel-actuating mechanism operable by said sliding rack, tape-connected spools mounted within the casing operatively engaging said sliding rack, mechanism secured to the casing capable of intermittent engagement with the circumferential projection of the said serrated wheel whereby an interrupted motion is imparted to the said spools and to the said sliding rack and manually operable means for reversing the interrupted motion of said spools and sliding rack.

In testimony that I claim the foregoing as my own I have hereto affixed my signature in the presence of two subscribing witnesses.

EMIL MATTSON.

Witnesses:
 ALBIN DAHLBERG,
 ANDREW DAHLBERG.